United States Patent [19]

Phillips

[11] Patent Number: 4,740,839
[45] Date of Patent: Apr. 26, 1988

[54] TV SURVEILLANCE SYSTEM THAT REQUIRES NO MECHANICAL MOTION

[76] Inventor: William R. Phillips, P.O. Box 18, Hazel Green, Ala. 35750

[21] Appl. No.: 60,873

[22] Filed: Jun. 12, 1987

[51] Int. Cl.$^4$ ............................................. H04N 7/18
[52] U.S. Cl. .................................. 358/108; 358/180; 358/209; 358/217
[58] Field of Search ................ 358/108, 180, 209, 217

[56] References Cited

U.S. PATENT DOCUMENTS

| | | | |
|---|---|---|---|
| 2,668,190 | 2/1954 | Sziklai | 358/217 |
| 3,705,328 | 12/1972 | Torok | 358/180 |
| 3,868,478 | 2/1975 | Zeenkov | 358/180 |
| 3,879,637 | 4/1975 | Woodworth | 358/180 |
| 3,953,764 | 4/1976 | Miller | 358/180 |
| 4,199,785 | 4/1980 | McCullough | 358/180 |
| 4,589,029 | 5/1986 | Torimaru | 358/180 |
| 4,644,405 | 2/1987 | Roy | 358/180 |

*Primary Examiner*—Howard W. Britton
*Attorney, Agent, or Firm*—Freddie M. Bush; Robert C. Sims

[57] ABSTRACT

This invention provides a method of providing TV surveillance without the need for cumbersome pan and tilt mechanisms. The method involves underscanning a conventional TV camera and dynamically moving the resultant reduced size raster over the photo conductive surface. Movement of the raster over the photo conductive surface emulates the vertical and horizontal movement provided by the pan and tilt mechanism.

1 Claim, 3 Drawing Sheets

TV SURVEILLANCE SYSTEM THAT REQUIRES NO MECHANICAL MOTION

DEDICATORY CLAUSE

The invention described herein may be manufactured, used, and licensed by or for the Government for governmental purposes without the payment to me of any royalties thereon.

BACKGROUND OF INVENTION

Video systems are commonly used throughout the commercial, industrial and military establishments for surveillance of areas for security reasons and general observation of activities and events. These systems usually utilize a black and white or color TV camera with a fixed focal length or zoom lens, and a TV monitor located remotely from the camera. With this type of system the camera is restricted to view in one direction, however the size of the area or field of view (FOV) may be controlled with a zoom lens. Some of the more complex systems provide for remote control of the zoom lens, thereby providing remote control of FOV. Whatever the case, the camera is viewing in only one direction and the center of the field of view does not change.

For surveillance situations that require the camera's FOV to be moved horizontally or vertically, a pan and tilt mechanism is used. This is a two-axis motorized device that can tilt the camera vertically up and down and pan the camera horizontally back and forth. These devices can be remotely controlled and can be programmed to move in some prescribed scenario or can be manually controlled by an operator who has a controller connected to the device.

The pan and tilt mechanism offers the advantage of providing wide angular excursions of camera tilting and panning. However, there are several disadvantages in their use. Some of these are:

a. They are heavy and cumbersome since they use electric motor drives.
b. They are large in size compared to the TV camera and require considerable space for their housing.
c. They are limited in speed at which they can pan and tilt the camera.
d. The movement of the camera can be seen by those being observed. This may be undesirable in locations such as banks, gaming facilities and areas where personnel performance is being measured.
e. They are expensive to obtain.

SUMMARY OF THE INVENTION

This invention provides a purely electronic means of providing the surveillance using a mechanical pan and tilt mechanism. The invention requires no mechanical motion, has no moving parts and eliminates the need of cumbersome mounting devices and bulky electric motors required to house and drive the pan and tilt mechanism. The method involves utilizing a television camera of the same type used with the pan and tilt device but requires a modification of the camera vertical and horizontal deflection coil drive circuitry. This modification involves reduction of the electron beam scanning raster on the vidicon photo conductive surface (underscanning). In addition, the modification allows movement of the reduced size raster to different locations on the photo conductive surface. This ability to relocate the raster anywhere on the surface allows the lineof sight (LOS) of the camera to be changed. This change in the LOS emulates the same LOS the camera would undergo when it is panned and tilted by the mechanical pan and tilt mechanism.

DETAILED DESCRIPTION OF THE PREFERRED EMBODIMENT

Figure 1:
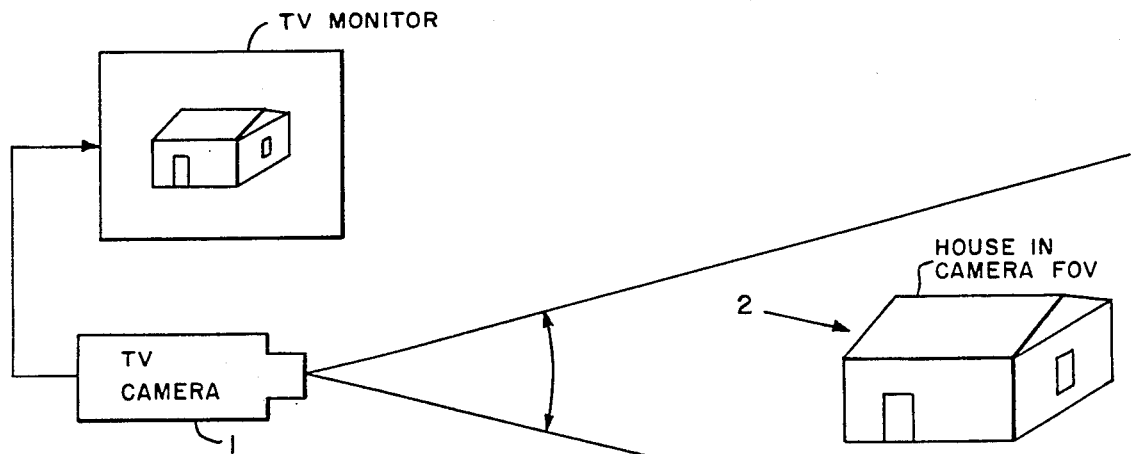
FIG. 1 is a typical diagram of a TV camera viewing an object with the object displayed on a monitor.
Figure 2A:
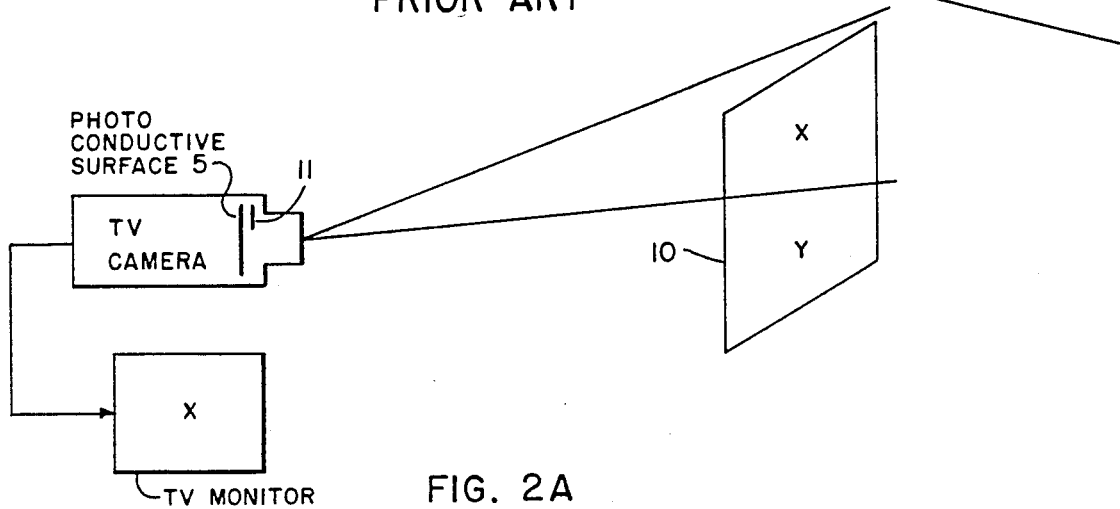
FIGS. 2A and 2B depict the photo conductive surface of the camera with the scanning raster at two different locations. In addition, the monitor display for the raster at each position is shown.
Figure 2B:
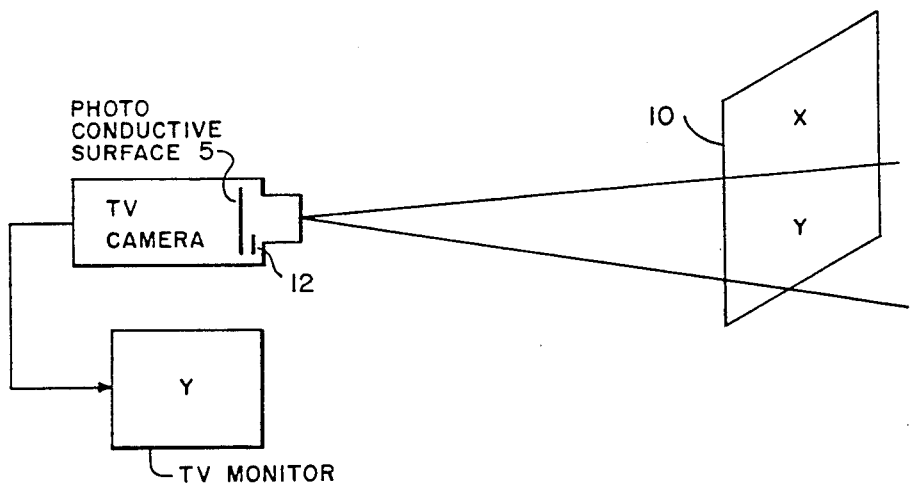

When a conventional TV camera 1 views a scene 2 such as that shown in FIG. 1, the camera operates with a scanning raster that normally occupies 20% of the active photo conductive surface. The raster is a rectangle with a height/width ratio of 3:4 centered at the center of the surface and typically has dimensions of 11 millimeters in width and 9 millimeters in height. However, the size of the raster can be reduced from its normal size by a factor of up to 6 and still maintain adequate resolution in picture detail. With the raster size reduced there are many different locations on the photo conductive surface where it can be positioned. The canter of the raster, no matter where it is located on the photo conductive surfaces (FIG. 2), will determine the center of the camera line-of-sight (LOS). If the raster is centered on the surface the camera LOS will be parallel to the camera. If the center of the raster is located off center of the surface the LOS will be at an angle with respect to the camera center line. The magnitude of this angle depends on how far the raster is located off center. This is illustrated in FIGS. 2A and 2B. The camera in both A and B is viewing a sign 10 that has the letter X at the top and the letter Y at the bottom. In 2A the raster is located at the top 11 of the photo conductive surfaces and the letter X will be displayed on the monitor. In 2B the raster is at the bottom 12 of the photo conductive surface and the monitor will display the letter Y. This movement of the raster over the photo conductive surface and hence, the altering of the camera LOS is analogous to either panning or tilting the camera mechanically with a pan and tilt mechanism.

Figure 3A:
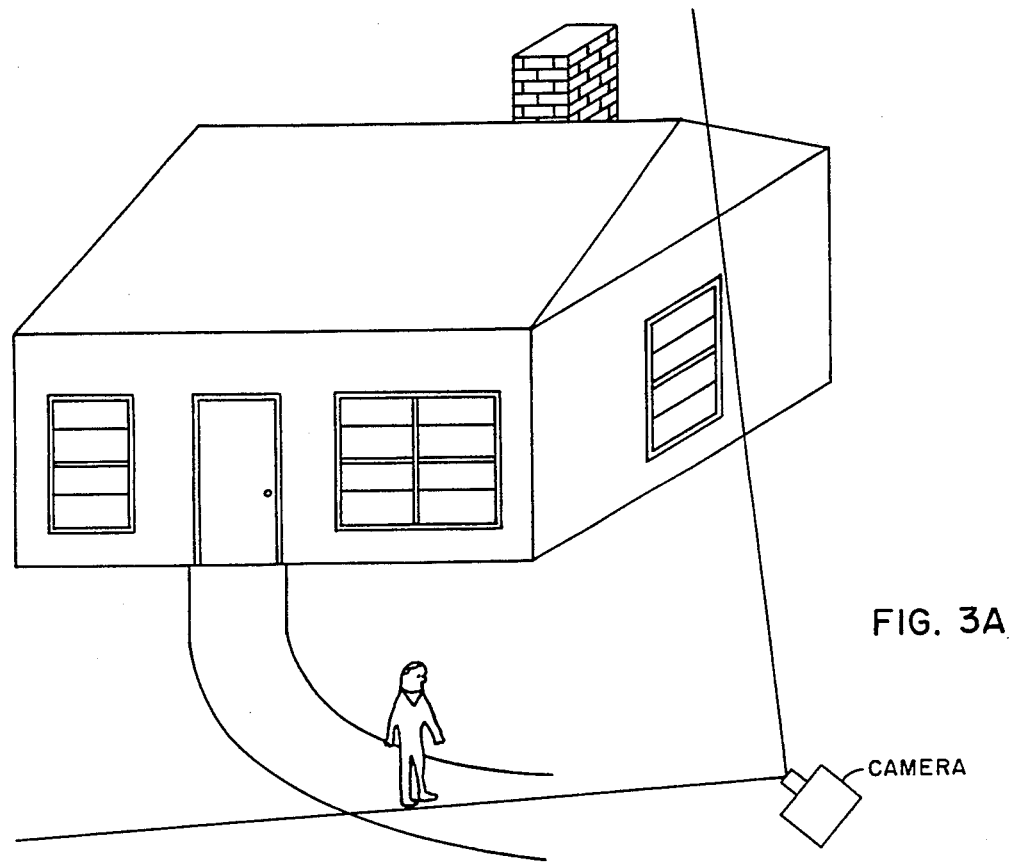
FIG. 3A-3C provides a more detailed description of how this invention provides the same type of surveillance as a camera mounted on a pan and tilt mechanism. The figures show a home being viewed and the raster positions on the photo conductive surface for different areas of the home. Also shown are the monitor displays for these areas.
Figure 3B:
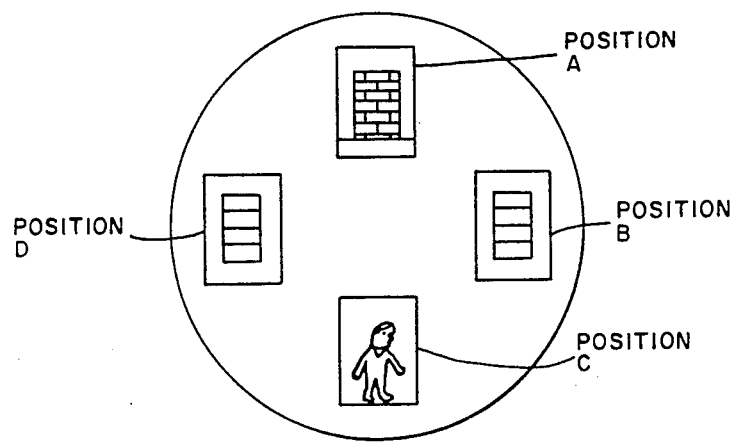
Figure 3C:
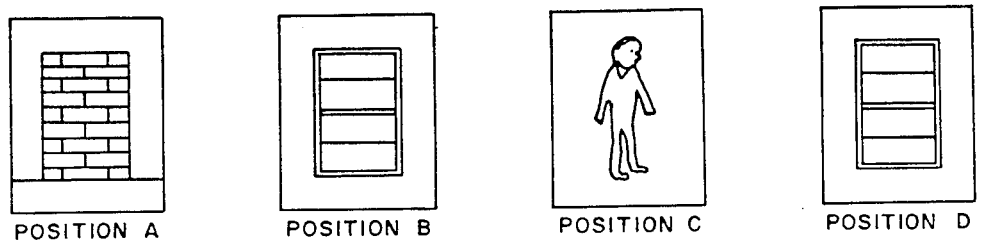

FIGS. 3A–C show a detail view of a scene being viewed as a function of the raster position. Shown are various monitor displays for a camera positioned to view a house. The camera has an instantaneous FOV such that only a small portion of the house can be viewed at one time. In order to see the complete house, an ordinary camera having an equal field of view would have to be tilted and panned over the entire area. Of course the camera could be arranged to take in the whole scene, however, the scale on the monitor would not be appropiate for detection in the detail that would be required.

Figure 4:
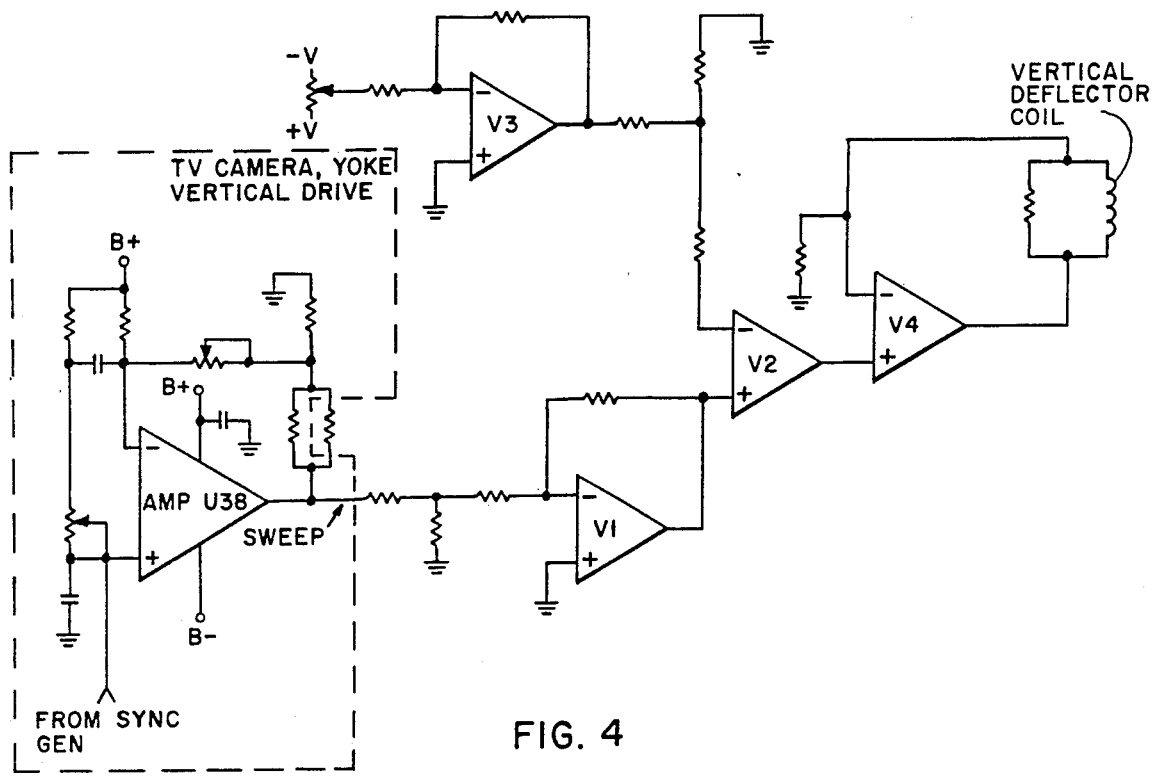
FIG. 4 shows the electronic circuit modifications required for a typical TV camera vertical deflection coil drive circuitry.
Figure 5:
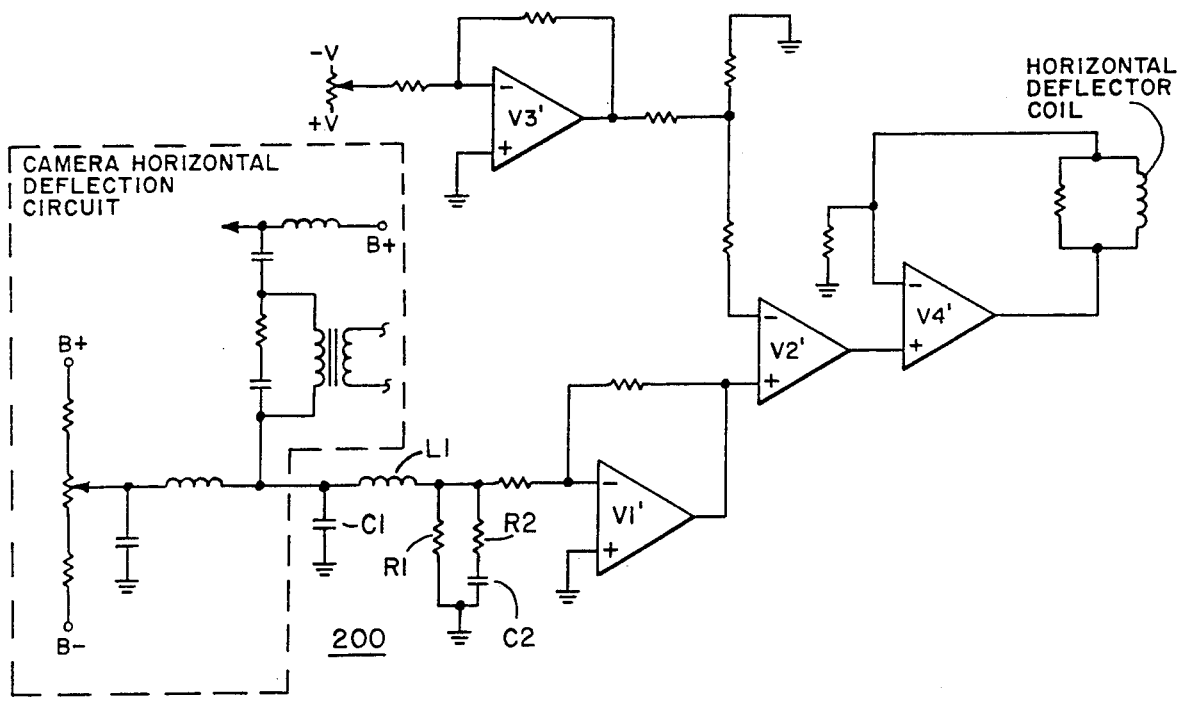
FIG. 5 shows the electronic circuit modification required for a typical TV camera horizontal deflection coil drive circuitry.

FIGS. 4 and 5 show the modification required for an RCA TC 2055 camera vertical and horizontal deflection coils for control of the raster size and position. In FIG. 4 the power amplifier V4 normally receives its input from Amplifier U38. However for this invention Amplifiers V2, V3, and V4 must be added to control the raster size and position. The vertical sync pulses obtained from the sync generator are input to amplifier V2 where it is summed with the output of Amplifier V3. V3 has as its input the control voltage for vertically positioning the raster. This input to V3 may ve from a joystick controller or a programmable source. The output of V2 is fed to power Amplifier V4 which drives the vertical deflection coil.

The modification for the horizontal circuits shown in FIG. 5 is basically the same although the method for generating the ramp voltage is different. An LC circuit 200 consisting of L1 and C1 are used to generate the ramp which is available at the junction of L1 and R1. From this point on the method of adjusting the raster size and position are the same as in the vertical circuit.

I claim:

1. A surveillance system comprising a TV camera located fixly such that a scene having a plurality of area will be reviewed, said camera having a vidicon photo conductive surface, circuit means connected to said camera such that the vertical and horizontal deflection coil drive circuitry can be changed such that a reduction of the electron beam scanning raster on the vidicon photo conductive surface will be obtained so as to underscan the scene, controlling the circuit means such that the scene can be scanned area by area even though the camera is located fixly, a monitor connected to said camera for viewing the areas scanned by the camera, and control means connected to the circuitry whereby a specific area of a specific size can be scanned and reviewed by said monitor.

* * * * *